United States Patent
Campana et al.

(10) Patent No.: US 10,872,347 B2
(45) Date of Patent: Dec. 22, 2020

(54) TRANSMITTING APPLICATION DATA FOR ON-DEVICE DEMOS

(71) Applicant: Google LLC, Mountain View, CA (US)

(72) Inventors: Bilson Jake Libres Campana, Mountain View, CA (US); Zile Wei, Freemont, CA (US); Hrishikesh Balkrishna Aradhye, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 482 days.

(21) Appl. No.: 15/563,198

(22) PCT Filed: Jun. 29, 2016

(86) PCT No.: PCT/US2016/040084
§ 371 (c)(1),
(2) Date: Sep. 29, 2017

(87) PCT Pub. No.: WO2017/004195
PCT Pub. Date: Jan. 5, 2017

(65) Prior Publication Data
US 2018/0089698 A1    Mar. 29, 2018

Related U.S. Application Data
(60) Provisional application No. 62/186,113, filed on Jun. 29, 2015.

(51) Int. Cl.
*G06Q 30/00* (2012.01)
*G06Q 30/02* (2012.01)
(Continued)

(52) U.S. Cl.
CPC ............... *G06Q 30/02* (2013.01); *G06F 9/48* (2013.01); *G06F 11/34* (2013.01); *G06F 3/0482* (2013.01); *H04W 4/60* (2018.02)

(58) Field of Classification Search
CPC ...................................................... G06Q 30/00
See application file for complete search history.

(56) References Cited

U.S. PATENT DOCUMENTS

| 8,845,337 B1* | 9/2014 | Hu ......................... G09B 25/00 434/365 |
| 9,058,194 B2* | 6/2015 | Murray ............... G06F 9/45533 |

(Continued)

FOREIGN PATENT DOCUMENTS

| CN | 103262065 A | 3/2013 |
| WO | 2013025292 A1 | 2/2013 |

OTHER PUBLICATIONS

Palm OS Tools Guide, Using the Palm OS Emulator, artnetweb.com, dated Nov. 9, 2012 (Year: 2012).*

(Continued)

*Primary Examiner* — Mark A Fadok
(74) *Attorney, Agent, or Firm* — Shumaker & Sieffert, P.A.

(57) ABSTRACT

A system and method to profile an application use and identify data used for application execution, map the identified data for application execution to a virtual memory associated with application execution, including execution beginning at specific times, states or stages of the application, and transmit the virtual memory to an end user wishing to demonstrate the application on an end user device. The end user device can emulate the application from any desired application start time, state or stage using data at the end user device identified by the virtual memory.

20 Claims, 2 Drawing Sheets

(51) Int. Cl.
　　*G06F 11/34*　　(2006.01)
　　*G06F 9/48*　　(2006.01)
　　*H04W 4/60*　　(2018.01)
　　*G06F 3/0482*　　(2013.01)

(56)　　References Cited

U.S. PATENT DOCUMENTS

| | | | |
|---|---|---|---|
| 9,183,116 B1* | 11/2015 | Ajith Kumar | G06F 11/3636 |
| 9,626,488 B2* | 4/2017 | Traversat | G06F 21/10 |
| 9,734,513 B1* | 8/2017 | Mehr | G06Q 30/0241 |
| 9,805,427 B2* | 10/2017 | Jemiolo | G06Q 50/01 |
| 9,875,129 B2* | 1/2018 | Murray | G06F 9/45533 |
| 10,311,496 B2* | 6/2019 | Hess | G06F 40/10 |
| 2005/0038933 A1* | 2/2005 | Himmel | G06F 9/4418 |
| | | | 710/15 |
| 2008/0127084 A1* | 5/2008 | Sattler | G06F 8/60 |
| | | | 717/121 |
| 2009/0063690 A1* | 3/2009 | Verthein | H04L 67/142 |
| | | | 709/228 |
| 2011/0138366 A1* | 6/2011 | Wintergerst | G06F 11/3409 |
| | | | 717/130 |
| 2011/0219105 A1* | 9/2011 | Kryze | G06F 15/16 |
| | | | 709/223 |
| 2011/0307354 A1* | 12/2011 | Erman | G06Q 30/0282 |
| | | | 705/27.1 |
| 2012/0096264 A1* | 4/2012 | Traversat | H04L 63/0442 |
| | | | 713/168 |
| 2012/0209586 A1* | 8/2012 | Mieritz | G06F 9/455 |
| | | | 703/22 |
| 2013/0041790 A1* | 2/2013 | Murugesan | H04L 29/06 |
| | | | 705/30 |
| 2013/0232485 A1* | 9/2013 | Murray | G06F 9/45533 |
| | | | 718/1 |
| 2014/0223482 A1* | 8/2014 | McIntosh | G11B 27/034 |
| | | | 725/41 |
| 2015/0277960 A1* | 10/2015 | Murray | G06F 9/45533 |
| | | | 705/26.8 |
| 2015/0310488 A1* | 10/2015 | Hess | G06F 16/245 |
| | | | 705/14.55 |
| 2016/0224320 A1* | 8/2016 | Jemiolo | G06Q 50/01 |

OTHER PUBLICATIONS

International Preliminary Report on Patentability from International Application No. PCT/US2016/040084, dated Jan. 2, 2018, 6 pp.
Response to 161(1) and 162 EPC Communication dated Feb. 6, 2018, from counterpart European Application No. 16738340.5, filed Jul. 20, 2018, 23 pp.
International Search Report and Written Opinion for PCT/US2016/040084 dated Sep. 14, 2016.
Notification of First Office Action and translation thereof from counterpart Chinese Application No. 201680018166.3, dated Feb. 18, 2020, 14 pp.
Cong Du Et al., "Dynamic Scheduling with Process Migration," 7th IEEE Int'l Symposium on Clustering Computing and the Grid, CCGRID 2007, IEEE Computer Soc. Proceedings, pp. 92-99 (May 14-17, 2007).
Second Office Action from counterpart Chinese Application No. 201680018166.3 dated Aug. 14, 2020, 11 pp.

* cited by examiner of a U.S. provisional patent application of Bilson Jake Libres Campana et al., entitled "Transmitting Application Data For On-Device Demos", Ser. No. 62/186,113, filed Jun. 29, 2015, the entire contents of said application being incorporated herein by reference.

TRANSMITTING APPLICATION DATA FOR ON-DEVICE DEMOS

CROSS-REFERENCE TO RELATED APPLICATIONS

This application claims the benefit under 35 U.S.C. 119(e) of a U.S. provisional patent application of Bilson Jake Libres Campana et al., entitled "Transmitting Application Data For On-Device Demos", Ser. No. 62/186,113, filed Jun. 29, 2015, the entire contents of said application being incorporated herein by reference.

BACKGROUND

With the proliferation of small, but powerful, portable computing devices, there has been a proportional increase of specialized applications and services that take advantage of the high performance network connectivity, location determination, cameras, and general computing power of such devices to provide timely and useful information to users for a wide range of purposes and situations. Although the abundance of choices of applications and services has provided users with a myriad of options and created a highly competitive marketplace, it has also created user difficulties with respect to accessing and evaluating applications and services.

In the mobile communication and computing arena, users can download and install small specialized applications, or "apps", to their individual portable computing devices (e.g. smart phones, tablet computers, laptop computers, and the like), to perform specific functions or engage in particular activities. Such functions and activities range from playing games and sharing photographs, to banking and finding real estate properties. As used herein, the term application may refer to any type of standalone or Internet connected application, program, or subroutine executed in any layer in the computing environment (e.g. in the operating system, in the middleware layer, or as a top layer application).

Digital distribution markets provide users with the opportunity to purchase any number of such applications for their mobile devices. The usual workflow for application search, discovery and purchase, such as to obtain a game application for example, typically begins when a user searches the market with a categorical query of interest (e.g. "action games"), and selects one or more interesting results. The user then analyzes the application details, user reviews, screenshots and other related content and if satisfied, downloads the application. The user can open and load the application, and setup the application to a working and representative state (i.e. get through menus, loading screens, account setup, tutorials, and so forth). The user can then test the application and if not satisfied with the test results, can either stop searching or return to at least the search process to look for alternative applications. However, the time required for a user to try out an application in such a manner may be significant due to the time involved in application download, overhead installation, and in-app setup.

Many applications may contain additional hurdles to experiencing the application. For example, applications may feature in-app purchases, third party account registrations and other actions requiring additional time or expense from the user that a user interested only in testing the application may not wish to invest.

Developers may attempt to address such issues by creating smaller trial versions of the applications, but this requires the developers to maintain multiple application versions. Further, developers may not be willing or able to provide truly representative application trial versions. In some cases, a developer may determine that it is necessary or desirable to provide modified screenshots that may not accurately reflect the actual application. Still further, some applications such as some games are already free-to-play and could be considered trial versions, yet still require some degree of application download, overhead installation and in-app setup.

Another proposed solution includes batch download of search-related, co-installed applications. However, even in this case, there is still a download cost. Many well produced, popular may be 50 MB or larger in download size, making the resulting batch transfer even larger. Such batch download also does not mitigate testing cost.

Another proposed solution includes batch download with batch application loading in the background (i.e. requiring only application switching on the device). However, this solution still has a significant download cost. Further, in this case, users start from the beginning of the application do not have the option to begin at a desired representative application state or time.

Still another proposed solution includes remote visualization and control. However, this solution does not reflect the application's performance on the user's device. Also, this solution cannot emulate in-app purchase states without side-effects (e.g. paying money, changing third party's servers, and so forth). Further, this solution requires maintenance of additional servers, and is not acceptable for high FPS action/shooting games due to latency.

BRIEF SUMMARY

An implementation of the disclosed subject matter directs an application provider to profile an application use and identify data that is used for application execution, map the identified data for application execution to a virtual memory associated with application execution, including execution beginning at specific times, states or stages of the application, and transmit the virtual memory as a data packet to an end user wishing to briefly demonstrate the application. The end user device may then emulate the application from any desired application start time, state or stage using data at the end user device that is identified by the virtual memory.

To do so, an implementation of the disclosed subject matter may provide the application provider with a profiler that can profile an application use at one or more devices and analyze the profile data to identify data used for application execution.

An implementation of the disclosed subject matter may provide the application provider with a virtual mapper that maps the identified data used for application execution to a virtual memory associated with application execution, including execution beginning at specific times, states or stages of the application.

An implementation of the disclosed subject matter may provide the application provider with a communication element to receive an application demonstration request from an end user device and provide the virtual memory associated with the requested application demonstration as a data packet that may be realtively small, to the end user device wishing to briefly demonstrate the application.

An implementation of the disclosed subject matter may provide the end user device with an on-device application emulator to emulate the application on the actual end user device using data at the end user device identified by the virtual memory when the end user device receives the virtual memory associated with the requested application demonstration.

An implementation of the disclosed subject matter may provide the application provider with a communication element to receive an application demonstration request from an end user device specifying a desired application start time, desired application start state and/or desired application start stage, and provide the virtual memory associated with the requested application demonstration start time, start state and/or start stage to the end user device.

An implementation of the disclosed subject matter may provide for the division of the virtual memory associated with the requested application demonstration so the application provider can sequentially communicate packets of the divided virtual memory associated with the requested application demonstration to the end user device, such that each subsequent packet is communicated as the end user device emulates the application using the previous packet.

An implementation of the disclosed subject matter may provide the application provider with an additional profiler that can profile an application use and analyze the profile data to identify data used for executing additional features of an application, and a virtual mapper that maps the identified data used for executing the additional features to a virtual memory associated with the additional features of the application for communication to the end user device wishing to briefly demonstrate the additional features of the application.

An implementation of the disclosed subject matter may provide the end user device with an exception handler that alerts the user of the end user device when the brief application demonstration at the end user device exceeds the expected bounds of the application or exceeds the demonstration abilities of the received virtual memory and/or the data at the end user device identified by the virtual memory.

Accordingly, implementations of the disclosed subject matter may provide means to profile an application use and identify data used for application execution, map the data used for application execution to a virtual memory associated with application execution, including execution beginning at specific times, states or stages of the application, and transmit the virtual memory as to an end user wishing to briefly demonstrate the application on the actual end user device.

Implementations of the disclosed subject matter also may provide an application provider with the ability to profile an application use and identify data used for application execution, map the data used for application execution to a virtual memory associated with application execution, including execution beginning at specific times, states or stages of the application, and transmit the virtual memory to an end user wishing to briefly demonstrate the application on the actual end user device. The end user device may emulate the application from any desired application start time, state or stage using data at the end user device identified by the virtual memory.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter. No attempt is made to show structural details in more detail than may be necessary for a fundamental understanding of the disclosed subject matter and various ways in which it may be practiced.

DETAILED DESCRIPTION

Figure 1:
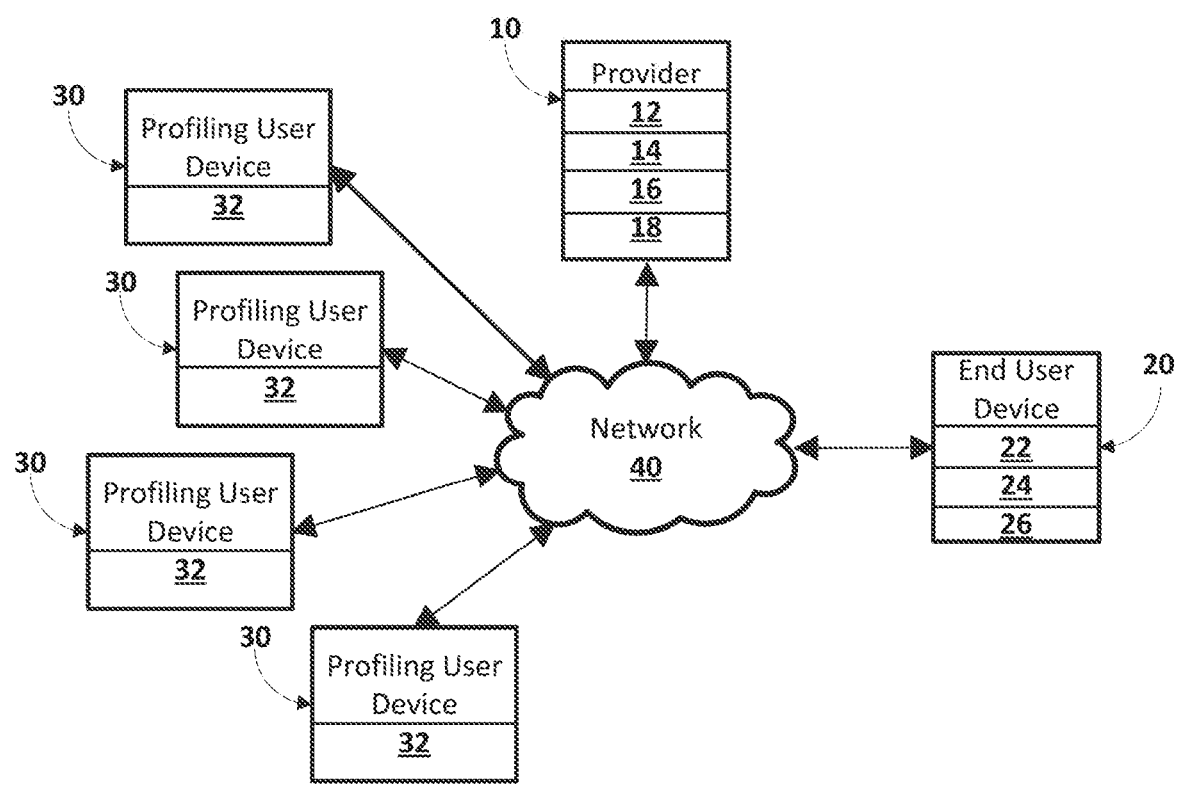
FIG. 1 shows an illustrative end-to-end system for creating and transmitting a virtual memory associated with an application execution to an end user for application demonstration, according to an implementation of the disclosed subject matter.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, and so forth. In other instances, well-known structures and devices are shown in block diagram form to facilitate describing the subject disclosure.

As described above, it has been determined that a need exists for systems and methods that may provide the ability for a user to briefly experience the execution and interaction of an application at various states, while requiring relatively low levels of data exchange, time and expense.

Accordingly, described herein are techniques for directing an application provider to identify and transmit a virtual memory to an end user device for short demonstrations of applications, in contrast to conventional systems in which the application provider is directed to download an application's entire data such as by downloading a conventional application package. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Implementations of the disclosed subject matter provide a user with an ability to briefly demonstrate an application at various states on the actual end user device, while requiring relatively minimal levels of data exchange, time and expense. To do so, implementations of the disclosed subject matter may direct an application provider to profile an application use to identify data used for application execution. For example, the application provider may identify the resources and commands required by a particular execution path, application state, or the like during use of the conventional application. The application provider may then map the data used for application execution to a virtual memory associated with the application execution, including execution beginning at specific times, states or stages of the application, and transmit the virtual memory to an end user device wishing to briefly demonstrate the application. The virtual memory may be transmitted to the end user device in a relatively small data packet, to provide for relatively minimal bandwidth usage and communication requirements. The end user device may emulate the application from the associated application start time, state and/or stage, on the actual end user device, using data at the end user device identified by the virtual memory, such as contents of the virtual memory, user input received by the user device, and the like. By emulating the application, or the relevant portion of the application, the overhead of downloading, installing, and configuring the application may be avoided. That is, the end user device may receive only the data used to provide a relatively small portion of the application to the user via use of the virtual memory.

Implementations of the disclosed subject matter may direct an application provider to transmit only a relatively small data packet or "memory footprint" that may be used to provide a short or brief application demonstration on the end user device, such as a demonstration that allows the user to access and use the application for one or a few minutes. This technique is in contrast to conventional systems in which the entire data of the application must be downloaded and run in a conventional manner on the user device. Implementations of the disclosed subject matter direct the application provider to transmit only the memory footprint used for the short demonstration of the application, such that the end user device may emulate the application using the memory footprint and contents of the required memory addresses identified by the virtual memory without requiring additional download of, or access to, the complete application.

As used herein, a "memory footprint" of a program may indicate a portion of runtime memory requirements, including program instruction code segments and data segments, stacks, tables and files that the program uses while the program is executed. Each footprint may also include a pointer to a subsequent footprint of memory, thereby forming chains of memory footprints. In some embodiments, an analysis of short and/or long chains of these memory footprints can be used to then form a series of data packets that enable brief program demonstrations on the end user device as disclosed herein. For example, an application provider may determine that a particular chain of memory footprints may provide an end user device access to the most-commonly accessed feature or features of an application, the underlying execution data and program code for which makes up only a relatively small portion of the entire application. This chain may then be provided in a relatively efficient manner to allow demonstration of the feature or features. Similarly, by identifying relatively long and short chains of memory footprints, transmission of the memory footprints associated with use of the application on an end user device may be queued and transmitted more efficiently than if subsequent footprints in a chain are identified in real time as a user executes and interacts with the application on the end user device.

To obtain such a "memory footprint", a profiling user device or plurality of profiling user devices may download all of the data (i.e. execution code, graphical content, music, and so forth) that is used to run the application locally. For example, a profiling user device may be used by an application developer or provider to generate memory footprints. When the application is loaded on the profiling user device, the data of the application is written to the profiling device memory and the device begins execution of the application. Throughout the usage of the application, the profiling device may load new content or portions of the application into memory, access an external server for data, read/write data from local device storage, and/or perform other actions which modify the application's state in memory.

Implementations of the disclosed subject matter may provide an application provider with a profiler application that can profile the application use at one or more profiling user devices and analyze the profile data for long chains and short chains of memory footprints to identify data used for application execution and, more specifically, identify data and the memory addresses at the profiling user devices that is used for execution of the application. To do so, the profiler can capture one or more "snapshots" of the profiling user device memory state while executing the application at any application time, state and stage, and identify the necessary memory input and output (IO) to run the application from one or more snapshots. This may be done with respect to time (e.g., to differentiate application starting points or times), application state (e.g., to differentiate application starting states), application stages (e.g., to differentiate application starting stages) or other variables which may be helpful when identifying desired application demonstrations.

Implementations of the disclosed subject matter may further provide the application provider with a virtual mapper that can create a virtual memory associated with each memory footprint, and which may be sent as to an end user device that has requested an application demonstration. The end user device may emulate the application using the necessary data, including I/O data at the end user device (i.e., contents of the memory addresses) identified by the virtual memory to run an application demonstration. The end user device may emulate the application at a desired application start time and/or application state of operation if specified. For example, an end user may specify that the desired application demonstration start at a specific time point in the application execution illustrating the specific time point of the application, such as to demonstrate a particular feature or interface of the application. As another example, the end user may specify that the desired application demonstration start at a specific state in the application execution, such as to demonstrate the specific state or user interface of the application. As another example, the end user may specify that the desired application demonstration start at a specific stage in the application execution, such as to provide a demonstration illustrating one or more stages of the application during use. In each case, implementations of the disclosed subject matter may include a data exchange between the application provider and the end user device that is a fraction of the usual data exchange that would be required during conventional execution of the application, as well as a fraction of the data loaded to memory of the end user device by the application.

The application provider may profile an application at one or more profiling user devices in a number of ways, including crowd sourcing, developer selection, random crawling or intelligent crawling. During crowd sourcing for example, a group of profiling user devices can be directed to use the application and the application provider can analyze the profile data, such as to identify long chain and short chain memory footprints as previously described. Profiling user devices may be selected specifically or at random, for example from among devices that have installed the application on the devices. For example, a developer may request or offer an incentive for conventional user devices having the application installed to participate in application testing or profiling. During developer selection, a developer may directly provide the profile data, such as for long chain and short chain memory footprints, based upon test or actual use of the application on profiling devices, and recommended application start times, states and/or stages. During a crawl operation, profiling user devices may be directed to random crawl an application to an arbitrary state or intelligently crawl an application for a better state determination, to provide the profile data to identify memory addresses for execution of the application, such as long chain and short chain memory footprints, and recommended application start times, states and/or stages. As with crowdsourcing, crawl techniques may ask or incentivize existing users of the conventional application to allow their end user devices to participate in application profiling operations.

FIG. 1 shows an illustrative end-to-end system according to an embodiment of the disclosed subject matter for creating a virtual memory associated with an application execution, including execution beginning at specific times, states or stages of the application, and transmitting the virtual memory as a minimally sized data packet to an end user wishing to briefly demonstrate the application. An end user device may emulate the application from any desired application start time, state and/or stage, on the end user device using input/output (I/O) data at the end user device identified by the virtual memory provided by the application provider as previously described.

The system of FIG. 1 includes an application provider 10, an end user device 20 and one or more profiling user devices 30 in communication through a network 40. The application provider 10 may further include a profiler 12, an additional profiler 14, a virtual mapper 16 and a communication element 18. The end user device 20 may further include an on-device app emulator 22, an exception handler 24 and a communication element 26. The profiling user device 30 may further include a communication element 32.

The application provider 10, end user device 20 and profiling user device 30 may be configured to communicate with one another via communication elements 18, 26 and 32 and the network 40, and various types of electronic communication protocols including, but not limited to, Wi-Fi, general packet radio service (GPRS), global system for mobile communications (GSM), enhanced data rates for GSM evolution (EDGE), 3G, 4G, 4G long-term expansion (LTE), worldwide interoperability for microwave access (WiMAX), Ethernet, the Internet, and other wireless and wired electronic communication protocols.

The end user device 20 and profiling user device 30 may include a smartphone, tablet device, laptop, set-top box, watch, eye-glasses, or other computer systems, and may locally execute applications using a local processor and memory. Such memory can include volatile and non-transitory computer readable media in the device. The end user device 20 and profiling user device 30 may further include various types of standardized or specialized user interface devices, such as touchscreens, keyboards, computer displays, voice (microphone/speaker), cameras, keyboards, proximity sensors, mice, styli, and so forth, and may further include a graphical user interface (GUI) generator for displaying a GUI on the device.

The profiling user device 30 may represent a single user device or a plurality of user devices that download the data (i.e. execution code, graphical content, music, and so forth) from the application provider 10 that is typically used to run an application locally. When the application is loaded, the application data is written to the profiling user devices' memory and they begin execution of the application. Throughout the usage of the application, the profiling user devices may load new contents into memory, access an external server for data, read/write data from local device storage and perform other functions that may modify the application's state in memory. More generally, execution of the application on a profiling device may proceed according to the conventional execution of the application if the profiling device was a conventional user device.

A profiler 12 of the application provider 10 may profile the application use at the profiling user device 30 and to identify chains of memory footprints including data used for execution of the application. As previously described, the profiler may categorize these chains into long and short chains. For example, short chains may be identified that can be provided to a user device that is demonstrating the application in a single data packet or series of data packets without requiring additional communication from a demonstrating user device between them. Similarly, long chains may be identified that may be provided or made accessible to a demonstrating user device in relation to additional communication received from a demonstrating device. The profiler 12 may capture a "snapshot" of the profiling user device 30 memory state while executing the application at any application time, state and stage, and identify and log the memory input and output used to run the application from the snapshot. This may be done with respect to time (i.e., to differentiate application starting points or times), application state (i.e., to differentiate application starting states), application stages (i.e., to differentiate application starting stages) or other variables which may be helpful in identifying and providing brief application demonstrations. A resulting collection of snapshots thus may reflect memory states with respect to application execution, including memory states with respect to specific application starting time, state, stage or other variable that may be helpful in identifying and providing brief application demonstrations.

The additional profiler 14 of the application provider 10 also may profile the application use at the profiling user device 30 and analyze the profile data to identify data used for executing new or additional features of an application, for example, where an application or an older version of an application may be installed on a user device that is to demonstrate a new or updated version of an application. In doing so, implementations of the disclosed subject matter thus may allow users who have already installed an application to test additional features and functions that may otherwise require a larger investment of time or money. For example, the user of a game that has multiple characters that may be unlocked either through use of the application or through in-app purchasing, while in a particular state and where the user would be required to purchase a particular character, can decide the value of the character without modifying their game state, making a purchase, or modifying the application providers third-party system to provide the user with the character.

Although shown separately for ease of understanding, in some implementations of the disclosed subject matter, the profiler 12 and additional profiler 14 of the application provider 10 can be embodied as a single profiler.

According to implementations of the disclosed subject matter, the application provider 10 may profile an application at one or more profiling user devices use in a number of ways, including crowd sourcing, developer selection, random crawling or intelligent crawling as described above.

The virtual mapper 16 of the application provider 10 may create a virtual memory associated with each snapshot captured by the profiler 12, 14. As noted above, the profiler 12, 14 may capture a snapshot of the profiling user device 30 memory state while executing the application and/or application additional features at any application time, state and stage, which identifies the memory I/O to run the application and/or additional features. This may be done with respect to time (i.e., to differentiate application starting points or times), application state (i.e., to differentiate application starting states), application stages (i.e., to differentiate application starting stages) or other variables as previously described, which may be helpful when identifying desired application demonstrations.

The virtual mapper 16 of the application provider 10 may create a virtual memory based on the profiling user device 30 memory state observed while executing the application and/or application additional features, that identifies the I/O data at the end user device 20 (e.g., contents of the required memory addresses) used to run an application demonstration associated with each snapshot captured by the profiler 12, 14. Further, since the snapshots are captured and the virtual memory mapped with respect to time, the end user device can specify an application demonstration beginning at a specific starting point or time within the application, beginning at a specific application state or stage, or beginning at any number of other specific conditions which may be helpful when demonstrating the application.

The virtual memory may be sent to the end user device 20 as a data packet when the end user device 20 requests a brief application demonstration. For example, a user may request an application demonstration on the actual end user device 20 without experiencing significant application download, overhead installation and in-app setup. The user may specify that the desired application demonstration start at a specific time point in the application execution illustrating the specific time point of the application or may specify that the desired application demonstration start at a specific state or stage in the application execution illustrating the specific state or stage of the application.

In another implementation of the disclosed subject matter, the virtual mapper 16 may divide the virtual memory so the application provider 10 can sequentially communicate the packets of the divided virtual memory to the end user device 20 providing streaming functionality, such that each subsequent packet may be communicated as the end user device 20 emulates the application using the previous packet. In one implementation of the disclosed subject matter, the application provider 10 can decrease the demonstration size by first sending a smaller data packet for a smaller trial or demonstration (e.g., 5 second demonstration instead of a 60 second demonstration), and streaming the larger demonstration as the end user device 20 demonstrates the application.

The end user device 20 may emulate the application using the I/O data at the end user device (i.e., contents of the memory addresses) identified by the virtual memory to run the application demonstration and/or additional features. The end user device 20 may emulate the application beginning at a specific starting point or time within the application, or beginning at a specific application state or stage if specified. In each case, implementations of the disclosed subject matter may include a data exchange between the application provider 10 and the end user device 20 that is a fraction of the usual data exchange, as well as a fraction of the data loaded to memory of the end user device by the application.

The on-device app emulator 22 of the end user device 20 may emulate the application on the end user device using the contents of the memory addresses at the actual end user device 20 identified by the virtual memory received from the application provider 10. The on-device app emulator 22 may emulate the application upon receipt of the virtual memory, and/or in response to a user input. For example, the end user device 20 may include a user interface, such as a "Try Now" button (not shown), that can send a command to the emulator 22 to emulate an identified application. In some embodiments, if the application demonstration exceeds expected bounds (e.g., if it tries to read memory that was not identified in the virtual memory) or exceeds demonstration abilities of the received virtual memory and/or the IO data at the end user device identified by the virtual memory, the exception handler 24 may alert the user of the end user device who may then request further demonstration beyond the current bounds. In response to the further or expanded demonstration request from the end user device 20, the application provider 10 can send additional data packets for the requested further or expanded demonstrations.

Figure 2:
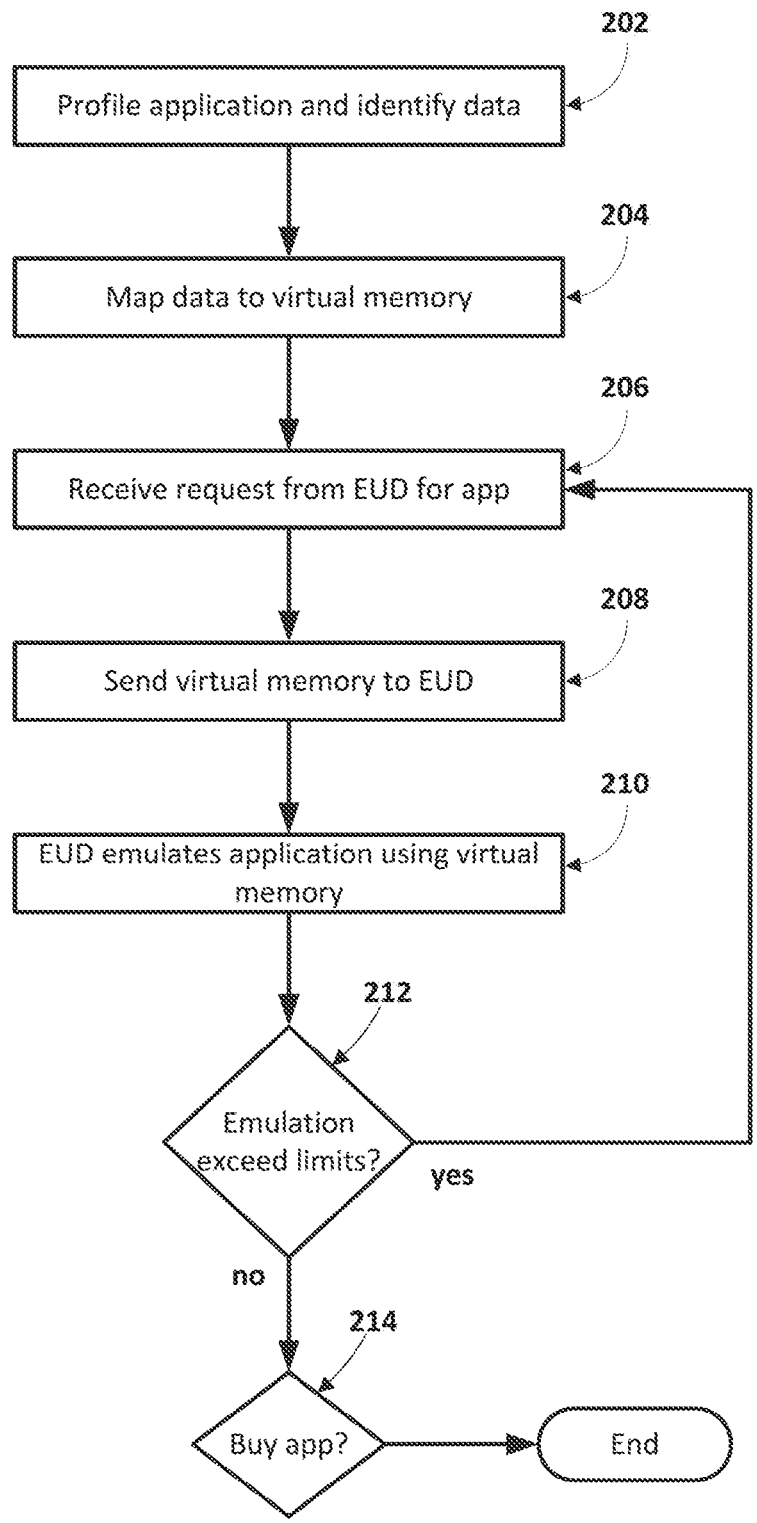
FIG. 2 is an illustrative flowchart depicting operations to create and transmit a virtual memory associated with an application execution to an end user for application demonstration, according to an implementation of the disclosed subject matter.

FIG. 2 is an illustrative flowchart depicting operations to create a virtual memory associated with an application execution, and to transmit the virtual memory to an end user for application demonstration, according to an implementation of the disclosed subject matter. The described operations may be accomplished using one or more of elements described herein and in some implementations, various operations may be performed in different sequences. In other implementations, additional operations may be performed along with some or all of the operations shown in FIG. 2. In yet other implementations, one or more operations may be performed simultaneously. In yet or implementations, one or more of operations may not be performed. Accordingly, the operations described should not be viewed as limiting.

In step 202, the profiler 12, 14 of the application provider 10 may profile an application use at one or more profiling user devices 30 and analyze the profile data to identify data required for application and additional feature execution, including execution beginning at specific times, states or stages of the application. As previously described, the profiler also may identify long and short chains of memory footprints associated with various execution paths or states of the application.

In step 204, the virtual mapper 16 of the application provider 10 may map data used for application execution to a virtual memory associated with an application and additional feature execution, including execution beginning at specific times, states or stages of the application. In an implementation of the disclosed subject matter, the virtual mapper 16 may divide the virtual memory so the application provider 10 may sequentially communicate the packets of the divided virtual memory to the end user device 20.

In step 206, the application provider 10 may receive an application demonstration request from the end user device 20. In one implementation of the disclosed subject matter, the application demonstration request from the end user device 20 may specify an application demonstration beginning at a specific starting point or time within the application, beginning at a specific application state or stage, or beginning at any number of other specific conditions which may be helpful when demonstrating the application. In another implementation of the disclosed subject matter, the application demonstration request from the end user device 20 may include an application additional features demonstration request.

In step 208, the application provider 10 may provide the virtual memory associated with the request as one or more data packets, which may be relatively small compared to other communications that would be used during conventional execution of the application, to the end user device 20 and in step 210, the end user device 20 may receive the data packet and the on-device application emulator 22 may emulate the application, beginning at a specific application state or stage if specified, on the actual end user device 20 using the virtual memory provided by the application provider 10. If requested, the on-device application emulator 22 also emulates the application additional features on the actual end user device 20 using the virtual memory provided by the application provider 10. In one implementation of the disclosed subject matter, the application provider 10 may sequentially communicate the packets of the divided virtual memory associated with the requested application demonstration to the end user device 20, such that, for example, each subsequent packet is communicated as the end user device 20 emulates the application using the previous packet.

In step 212, if the brief application demonstration at the end user device 20 exceeds the demonstration abilities of the received virtual memory associated with the requested application demonstration, the exception handler 24 of the end user device 20 alerts the user, and the user can return to step 206 and request further demonstration. At step 214, the end user device 20 can decide to buy the application if satisfied, or end the demonstration.

Various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing implementations of the disclosed subject matter. When implemented on a general-purpose microprocessor, the computer program code may configure the microprocessor to become a special-purpose device, such as by creation of specific logic circuits as specified by the instructions.

The disclosed subject matter may also be implemented using hardware that may include a processor, such as a general purpose microprocessor and/or an Application Specific Integrated Circuit (ASIC) that embodies all or part of the techniques according to the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to the disclosed subject matter.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

The illustrated aspects of the disclosure may also be practiced in distributed computing environments where certain tasks are performed by remote processing devices that are linked through a communications network. In a distributed computing environment, program modules can be located in both local and remote memory storage devices.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein. As a specific example, as described above, a user may be given the opportunity to determine whether or to what extent his device participates in a crowdsourcing technique as a profiling device.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In addition, while a particular feature of the subject innovation may have been disclosed with respect to only one of several implementations, such feature may be combined with one or more other features of the other implementations as may be desired and advantageous for any given or particular application.

Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements. Moreover, use of the term "an embodiment" or "one embodiment" throughout is not intended to mean the same embodiment unless specifically described as such. The terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component.

One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof. The words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The foregoing description, for purpose of explanation, has been described with reference to specific implementations. However, the illustrative discussions above are not intended to be exhaustive or to limit the disclosed subject matter to the precise forms disclosed. Many modifications and variations are possible in view of the above teachings. The implementations were chosen and described in order to explain the principles of the disclosed subject matter and their practical applications, to thereby enable others skilled in the art to utilize those implementations as well as various implementations with various modifications as may be suited to the particular use contemplated.

The invention claimed is:

1. A method comprising:
    capturing, by an application provider, one or more memory snapshots of a profiling user device memory state during a time duration, wherein capturing the one or more memory snapshots occurs while the profiling user device is executing an application installed on the profiling user device and after the profiling user device has begun executing the application;
    identifying, by the application provider and based on the one or more memory snapshots, data used for executing the application during the time duration;
    mapping, by the application provider, the data for executing the application during the time duration to a virtual memory;
    receiving, by the application provider and from an end user device, a request for a demonstration of the application, wherein the application is not installed at the end user device; and
    responsive to receiving the request for the demonstration of the application, transmitting, by the application provider and to the end user device, the virtual memory to enable the end user device to emulate the application as executed during the time duration.

2. The method of claim 1, further comprising:
    dividing the virtual memory into packets; and
    sequentially communicating the packets to the end user device.

3. The method of claim 1,
    wherein the request for the demonstration of the application specifies one or more of a desired application start time, a desired application start state, or a desired application start stage, the method further comprising:
    in response to receiving the request for the demonstration of the application, transmitting, to the end user device, the virtual memory corresponding to the request.

4. The method of claim 1, wherein the one or more memory snapshots include memory input and output necessary to execute the application for the time duration.

5. The method of claim 1, wherein an amount of the data for executing the application during the time duration is less than an amount of data required for executing the application in its entirety.

6. The method of claim 1, wherein the demonstration of the application is performed on the end user device using an emulator.

7. The method of claim 1, wherein the demonstration of the application ends when the demonstration attempts to access data that is not mapped to the virtual memory.

8. A system, comprising:
    a profiling user device, comprising:
        a network interface;
        one or more processors; and
        a memory that stores instructions executable by the one or more processors to:
            capture one or more snapshots of a portion of the memory over a period of time and during execution of an application, the portion of the memory including data required for the execution of the application during the period of time; and
            transmit, via the network interface and to an application provider, the one or more snapshots;
    the application provider, comprising:
        a network interface that receives the one or more snapshots from the profiling user device;
        one or more processors; and
        a memory that stores instructions executable by the one or more processors to:
            identify, based on the one or more memory snapshots, data used for executing the application during the period of time; and
            map the data used for executing the application during the period of time to a virtual memory; and
    an end user device, comprising:
        a network interface;
        one or more processors; and
        a memory storing instructions executable by the one or more processors to send, via the network interface of the end user device and to the application provider, a request for a demonstration of the application, wherein the application is not installed at the end user device,
    wherein the instructions stored by the memory of the application provider are further executable by the one or more processors of the application provider to, responsive to receiving the request for the demonstration of the application, transmit, via the network interface of the application provider and to the end user device, the virtual memory to enable the end user device to emulate the application as executed during the period of time.

9. The system of claim 8, wherein the one or more memory snapshots include memory input and output necessary to execute the application during the period of time.

10. The system of claim 8, wherein an amount of the data for executing the application during the period of time is less than an amount of data required for executing the application in its entirety.

11. The system of claim 8, wherein the request for the demonstration of the application specifies a time point, a state, or a stage of the application to start the demonstration.

12. The system of claim 8, wherein the instructions cause the one or more processors of the application provider to:

divide the virtual memory into packets; and sequentially communicate the packets to the end user device.

13. The system of claim 8, wherein the end user device includes an emulator to execute the demonstration of the application from the virtual memory.

14. The system of claim 8, wherein the demonstration of the application ends when the demonstration of the application attempts to access data that is not mapped to the virtual memory.

15. A non-transitory computer-readable medium encoded with instructions that, when executed, cause one or more processors of a computing system to:

capture one or more memory snapshots of a profiling user device memory state during a time duration, wherein capturing the one or more memory snapshots occurs while the profiling user device is executing an application installed on the profiling user device and after the profiling user device has begun executing the application;

identify, based on the one or more memory snapshots, data used for executing the application during the time duration;

map the data for executing the application during the time duration to a virtual memory;

receive, from an end user device and to an application provider, a request for a demonstration of the application, wherein the application is not installed at the end user device; and responsive to receiving the request for the demonstration of the application, transmit, from the application provider and to the end user device, the virtual memory to enable the end user device to emulate the application as executed during the time duration.

16. The non-transitory computer-readable medium of claim 15, wherein the one or more memory snapshots include memory input and output necessary to execute the application for the time duration.

17. The non-transitory computer-readable medium of claim 15, wherein an amount of the data for executing the application during the time duration is less than an amount of data required for executing the application in its entirety.

18. The non-transitory computer-readable medium of claim 15, wherein the request for the demonstration of the application specifies a time point, a state, or a stage of the application to start the demonstration.

19. The non-transitory computer-readable medium of claim 15, wherein the instructions cause the one or more processors to:

divide the virtual memory into packets; and sequentially communicate the packets to the end user device.

20. The non-transitory computer-readable medium of claim 15, wherein the demonstration of the application ends when the demonstration of the application attempts to access data that is not mapped to the virtual memory.

* * * * *